United States Patent
Zhang et al.

(10) Patent No.: US 10,156,451 B2
(45) Date of Patent: Dec. 18, 2018

(54) METHOD AND DEVICE OF ESTABLISHING NAVIGATION ROUTE

(71) Applicant: BOE Technology Group Co., Ltd., Beijing (CN)

(72) Inventors: Xiao Zhang, Beijing (CN); Ran Duan, Beijing (CN); Fan Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/808,989

(22) Filed: Nov. 10, 2017

(65) Prior Publication Data

US 2018/0306592 A1    Oct. 25, 2018

(30) Foreign Application Priority Data

Apr. 21, 2017    (CN) .......................... 2017 1 0264791

(51) Int. Cl.
*G01C 21/34*    (2006.01)
*G06F 19/00*    (2018.01)

(52) U.S. Cl.
CPC ....... *G01C 21/343* (2013.01); *G01C 21/3476* (2013.01); *G01C 21/3492* (2013.01)

(58) Field of Classification Search
CPC .............. G01C 21/343; G01C 21/3476; G01C 21/3492

USPC ......................................................... 701/423
See application file for complete search history.

(56) References Cited

U.S. PATENT DOCUMENTS

| | | | |
|---|---|---|---|
| 2008/0033638 A1* | 2/2008 | Hirayama | G01C 21/3632 701/532 |
| 2010/0191457 A1* | 7/2010 | Harada | G01C 21/3617 701/533 |
| 2010/0198507 A1* | 8/2010 | Lo | G01C 21/3679 701/533 |

* cited by examiner

*Primary Examiner* — Tan Q Nguyen
(74) *Attorney, Agent, or Firm* — Westman, Champlin & Koehler, P.A.

(57) ABSTRACT

The present disclosure provides method and device of establishing a navigation route. The method includes: acquiring a user's current position and a destination for the user; and establishing a navigation route between the current position and the destination according to user information and destination information, the user information including the type and/or a current speed of the user, the destination information including the number of people and/or an estimated visit duration at the destination, the destination including ones, at which the user has not yet arrived, of recommended sightseeing spots and/or user-interested sightseeing spots.

20 Claims, 5 Drawing Sheets

METHOD AND DEVICE OF ESTABLISHING NAVIGATION ROUTE

CROSS-REFERENCE TO RELATED APPLICATION

This application claims the benefit of the Chinese Patent Application No. 201710264791.2 filed on Apr. 21, 2017 in the State Intellectual Property Office of China, the whole disclosure of which is incorporated herein by reference.

BACKGROUND

Technical Field

Embodiments of the present disclosure generally relate to the field of navigation technology, and more particularly, to method and device of establishing a navigation route.

Description of the Related Art

The following problems may occur when touring in a large sightseeing place: firstly, the place is larger in size, thus a visitor, especially who visits the place for a first experience, could not find desired entertainment activities or sightseeing spots due to being unfamiliar to paths when visiting the place, resulting in loss in time and even missing some special programs and show time; second, the large-sized sightseeing place has very great attraction to visitors, so there will be a number of visitors visiting the place, and there will often be too many people at activities of high attention, which may not only affect experience of the visitors, but also may easily bring about potential safety hazards such as crowding, trampling or the like; third, the distribution of activities is not proper, such that some activities are overcrowded, while some activities lack visitors, resulting in that time arrangement of the visitors is not proper, wasting much time for queuing.

An existing navigation system may only provide guidance for a touring path for a visitor, but ignore delay due to too many people in a sightseeing spot, thereby resulting in loss in time for visitors.

SUMMARY

The present disclosure is provided to overcome at least one of the above and other problems and defects in the prior arts.

An object of the present disclosure is to provide method and device of establishing a navigation route, which can provide a planning route for a user according to distances from the user to respective sightseeing spots in a sightseeing place and current numbers of peoples in the respective sightseeing spots.

According to an embodiment of an aspect of the present disclosure, there is provided a method of establishing a navigation route, comprising:

acquiring a user's current position and a destination for the user; and establishing a navigation route between the current position and the destination according to user information and destination information, the user information includes the type and/or a current speed of the user, the destination information includes the number of people and/or an estimated visit duration at the destination, and the destination includes ones, at which the user has not yet arrived, of recommended sightseeing spots and/or user-interested sightseeing spots.

In one embodiment, the establishing a navigation route between the current position and the destination according to user information and destination information comprises: calculating a speed, which is required for the user to finish touring of not-yet-arrived sightseeing spots, according to a current time and information of the not-yet-arrived sightseeing spots, and providing a prompt message about the speed to the user.

In one embodiment, the method further comprises:

calculating a first speed which is required for the user to finish touring of not-yet-arrived recommended sightseeing spots or not-yet-arrived user-interested sightseeing spots, a second speed which is required for the user to finish touring both of not-yet-arrived recommended sightseeing spots and not-yet-arrived user-interested sightseeing spots, and a third speed which is required for the user to finish touring of all of not-yet-arrived sightseeing spots;

displaying, on a map, a navigation route from the current position to the not-yet-arrived recommended sightseeing spots or to the not-yet-arrived user-interested sightseeing spots if the current speed of the user is less than the first speed;

displaying, on the map, a navigation route from the current position to both the not-yet-arrived recommended sightseeing spots and the not-yet-arrived user-interested sightseeing spots if the current speed of the user is greater than the first speed and less than the second speed; and displaying, on the map, a navigation route from the current position to all of the not-yet-arrived sightseeing spots if the current speed of the user is greater than the second speed and less than the third speed.

In one embodiment, the method further comprises: calculating the number of queuing people at a next sightseeing spot in the established navigation route in case that the user arrives at the next sightseeing spot, and calculating an estimated queuing time duration for which the user is to wait according to the number of queuing people, and providing the estimated queuing time duration to the user.

In one embodiment, the method further comprises: calculating a traveling time duration of the user from the current position to the next sightseeing spot in the established navigation route, and an estimated queuing time duration and an estimated visit duration at the next sightseeing spot, and providing prompt messages about the traveling time duration, the estimated queuing time duration and the estimated visit duration to the user.

In one embodiment, the method further comprises: establishing, if there is a scheduled sightseeing spot for the user, a navigation route to the scheduled sightseeing spot as a preferential navigation route.

In one embodiment, the method further comprises:

calculating an estimated visit duration for touring through a next sightseeing spot in the established navigation route and a scheduled starting time of the scheduled sightseeing spot; and providing the user with a prompt message to prompt the user to go to the scheduled sightseeing spot directly if a time interval from a current time to the scheduled starting time of the scheduled sightseeing spot is less than the estimated visit duration for touring through the next sightseeing spot.

In one embodiment, the method further comprises: establishing a navigation route according to theme types corresponding to the sightseeing spots.

In one embodiment, the method further comprises: determining the current position of the user and displaying a marker for the current position on a map.

In one embodiment, the method further comprises: recording the sightseeing spots through which the user has toured so as to obtain information of not-yet-arrived sightseeing spots for the user; and adjusting in real time the navigation route established for the user according to the information of the not-yet-arrived sightseeing spots for the user and the user's actual route.

According to an embodiment of another aspect of the present disclosure, there is further provided a device of establishing a navigation route, comprising:

an acquisition module configured to acquire a user's current position and a destination for the user; and a route establishing module configured to establish a navigation route between the current position and the destination according to user information and destination information, the user information including the type and/or a current speed of the user, the destination information including the number of people and/or an estimated visit duration at the destination, the destination including ones, at which the user has not yet arrived, of recommended sightseeing spots and/or user-interested sightseeing spots.

In one embodiment, the route establishing module is further configured to calculate a speed, which is required for the user to finish touring of not-yet-arrived sightseeing spots, according to a current time and information of the not-yet-arrived sightseeing spots, and provide a prompt message about the speed to the user.

In one embodiment, the route establishing module is further configured to:

calculate a first speed which is required for the user to finish touring of not-yet-arrived recommended sightseeing spots or not-yet-arrived user-interested sightseeing spots, a second speed which is required for the user to finish touring both of not-yet-arrived recommended sightseeing spots and not-yet-arrived user-interested sightseeing spots, and a third speed which is required for the user to finish touring of all of not-yet-arrived sightseeing spots;

display, on a map, a navigation route from the current position to the not-yet-arrived recommended sightseeing spots or to the not-yet-arrived user-interested sightseeing spots if the current speed of the user is less than the first speed;

display, on the map, a navigation route from the current position to both the not-yet-arrived recommended sightseeing spots and the not-yet-arrived user-interested sightseeing spots if the current speed of the user is greater than the first speed and less than the second speed; and display, on the map, a navigation route from the current position to all of the not-yet-arrived sightseeing spots if the current speed of the user is greater than the second speed and less than the third speed.

In one embodiment, the route establishing module is further configured to calculate the number of queuing people at a next sightseeing spot in the established navigation route in case that the user arrives at the next sightseeing spot, and calculate an estimated queuing time duration for which the user is to wait according to the number of queuing people, and provide the estimated queuing time duration to the user.

In one embodiment, the route establishing module is further configured to calculate a traveling time duration of the user from the current position to the next sightseeing spot in the established navigation route, and an estimated queuing time duration and an estimated visit duration at the next sightseeing spot, and provide prompt messages about the traveling time duration, the estimated queuing time duration and the estimated visit duration to the user.

In one embodiment, the route establishing module is further configured to establish, if there is a scheduled sightseeing spot for the user, a navigation route to the scheduled sightseeing spot as a preferential navigation route.

In one embodiment, the route establishing module is further configured to: calculate an estimated visit duration for touring through a next sightseeing spot in the established navigation route and a scheduled starting time of the scheduled sightseeing spot; and provide the user with a prompt message to prompt the user to go to the scheduled sightseeing spot directly if a time interval from a current time to the scheduled starting time of the scheduled sightseeing spot is less than the estimated visit duration for touring through the next sightseeing spot.

In one embodiment, the route establishing module is further configured to establish a navigation route according to theme types corresponding to the sightseeing spots.

In one embodiment, the route establishing module is further configured to determine the current position of the user and displaying a marker for the current position on a map.

In one embodiment, the route establishing module is further configured to: record the sightseeing spots through which the user has toured so as to obtain information of not-yet-arrived sightseeing spots for the user; and adjust in real time the navigation route established for the user according to the information of the not-yet-arrived sightseeing spots for the user and the user's actual route.

DETAILED DESCRIPTION OF PREFERRED EMBODIMENTS

In order to more clearly provide the objectives, technical solutions and advantages of the embodiments of the present disclosure, the technical solutions in the embodiments of the present disclosure will be clearly and completely described below, with reference to the accompanying drawings in the embodiments of the present disclosure. It will be apparent that the described embodiments only represent a part of the present disclosure, rather than all the embodiments of the present disclosure. All other embodiments obtained by those skilled in the art based on the embodiments of the present disclosure without creative efforts fall within the scope of the present disclosure.

In addition, in the description as below, much specific detail is described to provide comprehensive understanding of the embodiments of the present disclosure for ease of presentation. However, it is obvious one or more embodiments may be implemented without the detail. In other situation, known structure and device are shown by means of diagrammatic presentation to simplify the accomplish drawings.

Figure 1:
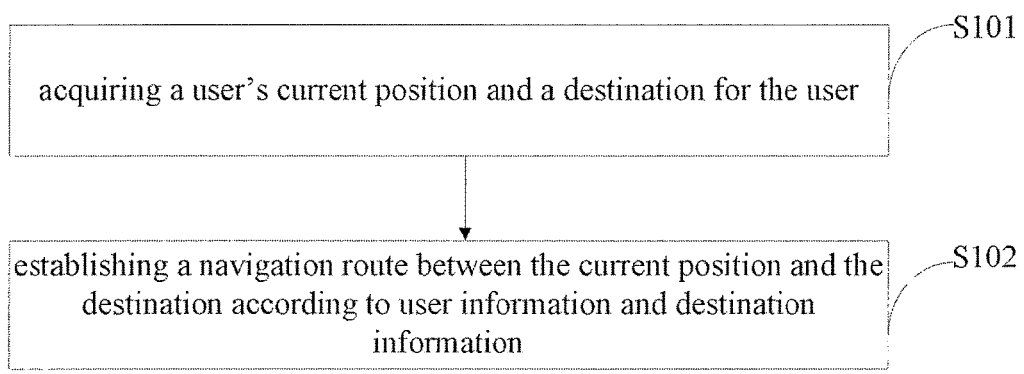
FIG. 1 is a flow chart of a method of establishing a navigation route according to an exemplary embodiment of the present disclosure.

FIG. 1 is a flow chart of a method of establishing a navigation route according to an exemplary embodiment of the present disclosure. As shown in FIG. 1, the method of establishing a navigation route according to this embodiment may specifically comprises following steps:

Step S101: acquiring a current position and a destination of a user.

An executive agent for this embodiment may be a mobile terminal. Specifically, the mobile terminal may be a personal mobile terminal held by the user, for example, a mobile phone, a tablet computer, a notebook computer, or the like, or may also be a special tour guide device provided by the place where the user arrives, for example, an amusement park.

The mobile terminal may determine a position where the user is located so as to obtain a current position of the user. The user may input or choose a destination on the mobile terminal.

Step S102: establishing a navigation route between the current position and the destination according to user information and destination information, the user information including the type and/or a current speed of the user, the destination information including the number of people and/or an estimated visit duration at the destination, the destination including ones, at which the user has not yet arrived, of recommended sightseeing spots and/or sightseeing spots of the user' interest.

Exemplarily, the mobile terminal may display information of the place where the user arrives, including a map, a navigation route, the number of people at a sightseeing spot, an estimated visit duration and the like. Further, the mobile terminal may record basic information, such as the type of the user, for example, age, sex or the like, and a current speed, of the use, such that a server in communication with the mobile terminal may recommend sightseeing spots for touring of the user based on the basic information. Of course, the user may also mark sightseeing spots of his/her interest, such that the mobile terminal may establish various navigation routes for the user according to the basic information of the user and according to the recommended sightseeing spots and/or user-interested sightseeing spots.

In an example, the estimated visit duration may be a possible visit duration of the user at the destination, including a time duration of a performance program (if any) at the destination, a possible staying duration calculated according to a travelling speed of the user and a route to the destination, or the like.

With the technique solution of this embodiment, the current position and the destination of the user are acquired, and a navigation route is established between the current position and the destination according to user information and destination information. In some examples, when establishing the navigation route, the physical performance and possible preference of the user may be determined by making a reference to the type and current speed of the user, and a time duration required for the user to touring through the destination may also be determined by making a reference to the number of people and/or the estimated visit duration at the destination, such that an appropriate navigation route may be established for the user, saving time for the user. For a user who just enters the sightseeing place, a possible touring or travelling speed of the user may be substantially determined based on the type of the user and/or statistical data of touring speeds of other visitors or users at the sightseeing place.

Figure 2:
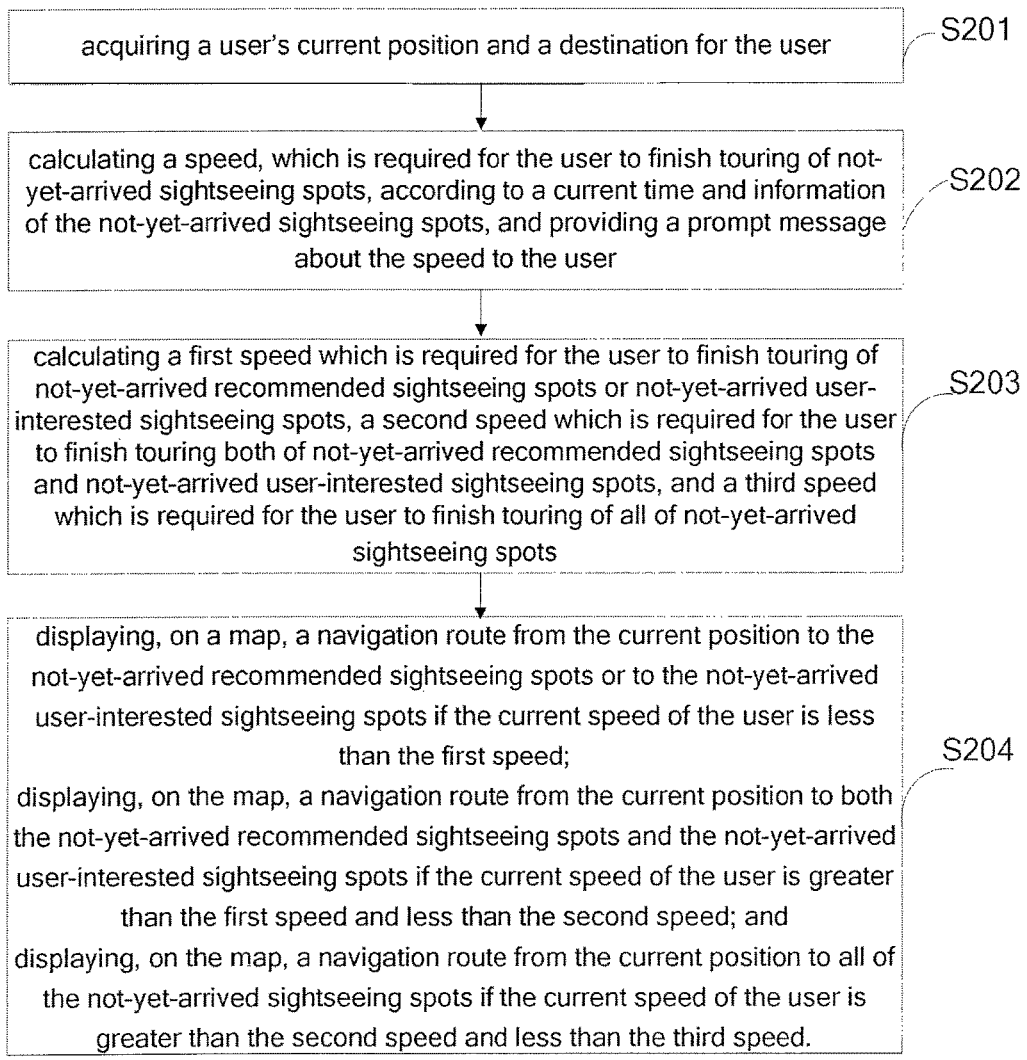
FIG. 2 is a flow chart of a method of establishing a navigation route according to another exemplary embodiment of the present disclosure.

FIG. 2 is a flow chart of a method of establishing a navigation route according to another exemplary embodiment of the present disclosure. Technique schemes of the present disclosure will be further described in detail in the method of establishing a navigation route according to this embodiment on basis of the embodiment shown in FIG. 1. As shown in FIG. 2, the method of establishing a navigation route according to this embodiment may specifically comprises following steps:

Step S201: acquiring a current position and a destination of a user.

An executive agent for this embodiment may be a mobile terminal. Specifically, the mobile terminal may be a personal mobile terminal held by the user, for example, a mobile phone, a tablet computer, a notebook computer, or the like, or may also be a special tour guide device provided by the place where the user arrives, for example, an amusement park.

The mobile terminal may determine a position of the user so as to obtain a current position of the user. The user may input or choose a destination on the mobile terminal.

Step S202: calculating a speed, which is required for the user to finish touring of not-yet-arrived sightseeing spots, according to current time and information of the not-yet-arrived sightseeing spots, and providing, sending or displaying a prompt message about the speed to the user.

In an example, the mobile terminal may record the sightseeing spots through which the user has toured so as to obtain information of not-yet-arrived sightseeing spots for the user, and adjust in real time the navigation route established for the user according to the information of not-yet-arrived sightseeing spots for the user and the user's actual route.

On basis of an opening time duration of a sightseeing place where the user arrives, which is, for example, T, and of a time at which the user arrives at the sightseeing place, a speed at which the user may complete touring of all sightseeing spots is $V_{sta}$ if the user enters the sightseeing place at the time the sightseeing place starts opening, so a speed at which the user may complete touring of all sightseeing spots is $V_{average}=V_{sta}*T/(T-t)$ if the user enters the sightseeing place after the sightseeing place has started opening for a period of time t.

Further, if the user has toured for a length of time t' at an actual touring speed $V_{actual}$, a speed required for the user to complete touring of all not-yet-arrived sightseeing spots in the sightseeing place is calculated as $V_{remaining}=(V_{sta}*T-V_{actual}*t')/(T-t-t')$.

Illustratively, the information associated with a certain sightseeing spot at which the user has not yet arrived may include an opening time duration of the sightseeing place where the user arrives, distances from the current position of the user to the sightseeing spots through which the user has not toured, an estimated queuing time duration and an estimated visit duration at the sightseeing spot, or the like, as described below.

Step S203: calculating a first speed which is required for the user to finish touring of not-yet-arrived recommended sightseeing spots or not-yet-arrived user-interested sightseeing spots, a second speed which is required for the user to finish touring of not-yet-arrived recommended sightseeing spots and not-yet-arrived user-interested sightseeing spots, and a third speed which is required for the user to finish touring of all of not-yet-arrived sightseeing spots.

For example, the first speed which is required for the user to finish touring of not-yet-arrived recommended sightseeing spots or not-yet-arrived user-interested sightseeing spots is $v_1$, the second speed which is required for the user to finish touring of not-yet-arrived recommended sightseeing spots and not-yet-arrived user-interested sightseeing spots is $v_2$, and the third speed which is required for the user to finish touring of all of not-yet-arrived sightseeing spots is $v_3$, where $v_1 \leq v_2 \leq v_3$.

Step S204: displaying, on a map, a navigation route from the current position to the not-yet-arrived recommended sightseeing spots or the not-yet-arrived user-interested sightseeing spots if the current speed of the user is less than the first speed;

displaying, on the map, a navigation route from the current position to the not-yet-arrived recommended sightseeing spots and the not-yet-arrived user-interested sightseeing spots if the current speed of the user is greater than the first speed and less than the second speed; and displaying, on the map, a navigation route from the current position to all of the not-yet-arrived sightseeing spots if the current speed of the user is greater than the second speed and less than the third speed.

As can be seen if the current speed of the user is v and if $v \leq v_1$, the current speed of the user is slower and it is not possible for the user to tour through all sightseeing spots, thus a navigation route from the current position to the not-yet-arrived recommended sightseeing spots or the not-yet-arrived user-interested sightseeing spots may be established for the user; if $v_1 \leq v \leq v_2$, the speed of the user is faster but it is still not possible for the user to tour through all sightseeing spots, thus a navigation route from the current position to the not-yet-arrived recommended sightseeing spots and the not-yet-arrived user-interested sightseeing spots may be established for the user; if $v_2 \leq v \leq v_3$, the speed of the user is faster and it is possible for the user to tour through all sightseeing spots, thus a navigation route from the current position to all of the not-yet-arrived sightseeing spots may be established for the user. It will be appreciated by those skilled in the art that if $v \geq v_3$, it is possible for the user to tour through all sightseeing spots, and in this case, a navigation route from the current position to all of the not-yet-arrived sightseeing spots may be still established for the user.

With the technique solution of this embodiment, speeds which are required for touring not-yet-arrived recommended sightseeing spots and/or not-yet-arrived user-interested sightseeing spots are calculated, such that navigation routes to the not-yet-arrived recommended sightseeing spots and/or the not-yet-arrived user-interested sightseeing spots, or to all sightseeing spots are provided for the user according to a relationship between the above corresponding speeds and the current speed of the user.

Figure 3:
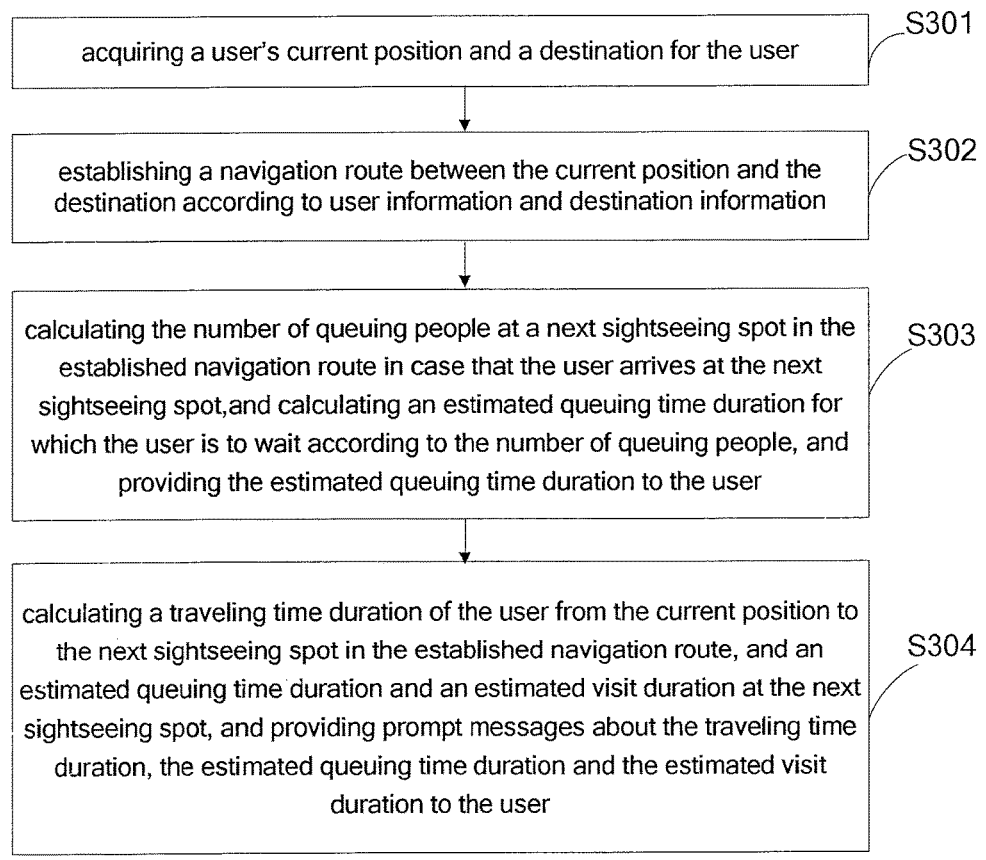
FIG. 3 is a flow chart of a method of establishing a navigation route according to a further exemplary embodiment of the present disclosure.

FIG. 3 is a flow chart of a method of establishing a navigation route according to a further exemplary embodiment of the present disclosure. Technique schemes of the present disclosure will be further described in detail in the method of establishing a navigation route according to this embodiment on basis of the embodiment shown in FIG. 1. As shown in FIG. 3, the method of establishing a navigation route according to this embodiment may specifically comprises following steps:

Step S301: acquiring a current position and a destination of a user.

An executive agent for this embodiment may be a mobile terminal. Specifically, the mobile terminal may be a personal mobile terminal held by the user, for example, a mobile phone, a tablet computer, a notebook computer, or the like, or may also be a special tour guide device provided by the place where the user arrives, for example, an amusement park.

The mobile terminal may determine a position of the user so as to obtain a current position of the user. The user may input or choose a destination on the mobile terminal.

Step S302: establishing a navigation route between the current position and the destination according to user information and destination information, the user information including the type and/or a current speed of the user, the destination information including the number of people and/or an estimated visit duration at the destination, the destination including ones, at which the user has not yet arrived, of recommended sightseeing spots and/or sightseeing spots of the user' interest.

Exemplarily, the mobile terminal may record the sightseeing spots through which the user has toured so as to obtain information of not-yet-arrived sightseeing spots for the user, and adjust in real time the navigation route established for the user according to the information of not-yet-arrived sightseeing spots for the user and the user's actual route.

Assuming that an opening time duration of a sightseeing place where the user arrives is, for example, T, the user enters the sightseeing place after the sightseeing place has started opening for a period of time, for example t, and a distance to the sightseeing spots through which the user has not yet toured is, for example, 1, then a speed required for the user to finishing touring not-yet-arrived sightseeing spots may be calculated as $V=1/(T-t)$.

Step S303: calculating the number of queuing people at a next sightseeing spot in the established navigation route in case that the user arrives at the next sightseeing spot, and calculating an estimated queuing time duration for which the user is to wait or queue according to the number of queuing people, and providing the estimated queuing time duration to the user.

For example, an estimated visit duration required for one sightseeing spot is $T_1$, and when the user comes at a queuing region of the sightseeing spot, a receiver apparatus which is provided in the queuing region will receive a signal from the mobile terminal. If the mobile terminal is a mobile phone, the receiver apparatus may be a base station; the signals received by the receiver apparatus are counted, such that the current number of queuing people may be determined for example as N.

In some examples, the number of people around a sightseeing spot in which the user is to come may be estimated. Exemplarily, a sightseeing spot to which another user is closest may be processed as a desired sightseeing spot for the another user, and a sightseeing spot to which the another user is secondarily closer may be processed as a desired sightseeing spot for the another user if the another user has toured through the closest sightseeing spot, thereby estimating the numbers of people at respective sightseeing spots.

For example, when counting the number of people around a certain user A, assuming that a distance from the user A to one sightseeing spot is $S_A$, a current speed of the user A is $V_A$, a distance from a user B around the user A to the sightseeing spot is $S_B$ and a current speed of the user B around the user A is $V_B$, then:

if $S_A/V_A \leq S_B/V_B$, that is, a length of time for the another user B to reach the sightseeing spot is greater than a length of time for the user A to reach the sightseeing spot, thus the user A will reach the sightseeing spot at earlier time than the another user B, and the user B may not be counted into the number of queuing people; and if $S_A/V_A > S_B/V_B$, that is, a length of time for the another user B to reach the sightseeing spot is less than a length of time for the user A to reach the sightseeing spot, thus the user B will reach the sightseeing spot at earlier time than the user A, and the user B will be counted into the number of queuing people.

If lengths of time for a number of users, for example, M other users, to reach the sightseeing spot are all less than the length of time for the user A to reach the sightseeing spot, there may be (mostly) M+N persons who are queuing when the user A arrives at the sightseeing spot. A preset time length for buying a ticket by each person is t0, then a possible or estimated waiting or queuing duration for the user A may be calculated as $t0*(M+N-S_AN_A/t0)$, where "$S_A/V_A/t0$" represents the number of people who have bought tickets at the sightseeing spot within a period of time for which the user A spends to travel and reach the sightseeing spot. If a distance of the user A to the sightseeing spot is very small, it may be determined that there is no change or a little negligible change in N when the user A arrives at the sightseeing spot, that is, "$S_A/V_A/t0$" may be negligible, then a possible or estimated (maximum) waiting or queuing duration for the user A may be calculated as $t0*(M+N)$.

Step S304: calculating a traveling time duration of the user from the current position to the next sightseeing spot in the established navigation route, and an estimated queuing time duration and an estimated visit duration at the next sightseeing spot, and providing, sending or displaying prompt messages about these time durations to the user.

For example, a time duration of the user traveling from the current position to the next sightseeing spot is $t_1$, an estimated visit duration of the user at the next sightseeing spot is $t_2$, and an estimated queuing time duration of the user at the next sightseeing spot is $t_3$, then a total time duration for the user to finish touring of the next sightseeing spot starting from the current position may be calculated as $t_1+t_2+t_3$, and meanwhile, a prompt message about the total time duration is provided, sent or displayed to the user, so that the user may adjust the route according to actual situations and touring time duration. Exemplarily, the estimated visit duration may be a possible visit duration of the user at the destination, including a time duration of a performance program (if any) at the destination, a possible staying duration calculated according to a travelling speed of the user and a route to the destination, or the like.

The technique solution of this embodiment is configured to calculate the number of queuing people at a next sightseeing spot in the established navigation route in case that the user arrives at the next sightseeing spot, calculate an estimated queuing time duration for which the user is to wait or queue according to the number of queuing people, and provide the estimated queuing time duration to the user, such that the user may determine whether or not the next sightseeing spot is to be toured or change the route according to the possible or estimated waiting or queuing duration.

Figure 4:
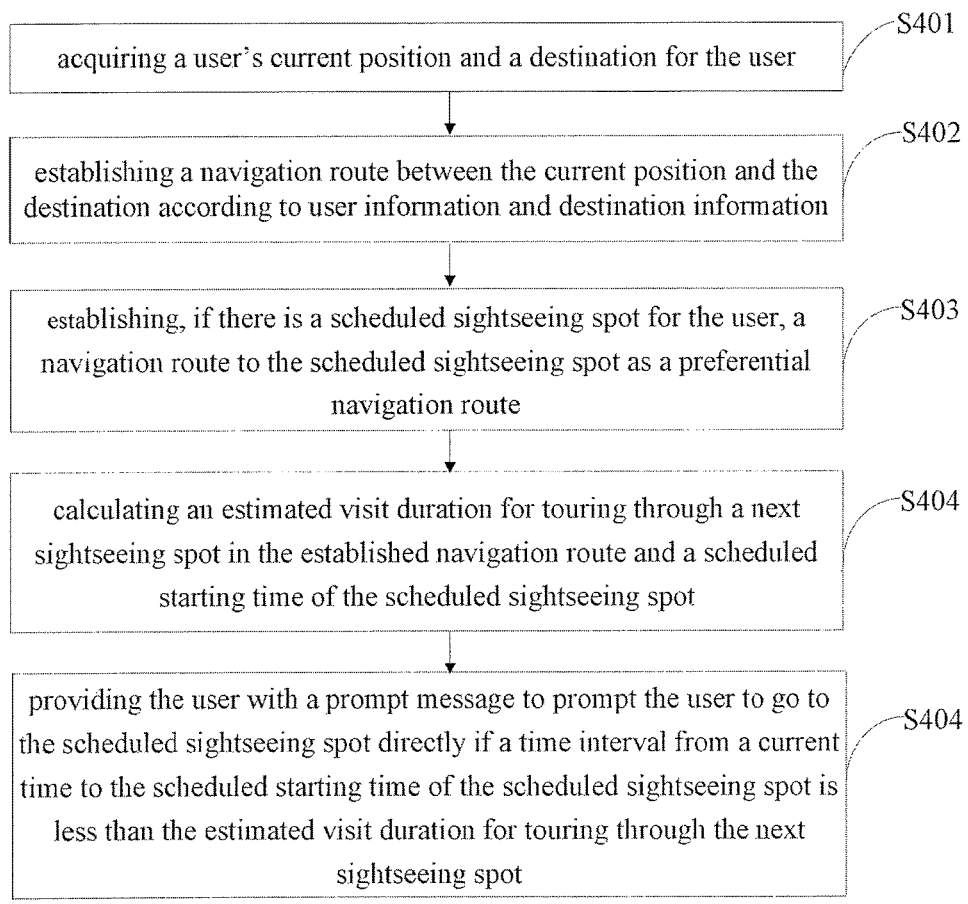
FIG. 4 is a flow chart of a method of establishing a navigation route according to a still further exemplary embodiment of the present disclosure.

FIG. 4 is a flow chart of a method of establishing a navigation route according to a still further exemplary embodiment of the present disclosure. Technique schemes of the present disclosure will be further described in detail in the method of establishing a navigation route according to this embodiment on basis of the embodiment shown in FIG. 1. As shown in FIG. 4, the method of establishing a navigation route according to this embodiment may specifically comprises following steps:

Step S401: acquiring a current position and a destination of a user.

An executive agent for this embodiment may be a mobile terminal. Specifically, the mobile terminal may be a personal mobile terminal held by the user, for example, a mobile phone, a tablet computer, a notebook computer, or the like, or may also be a special tour guide device provided by the place where the user arrives, for example, an amusement park.

The mobile terminal may determine a position of the user so as to obtain a current position of the user. The user may input or choose a destination on the mobile terminal.

Step S402: establishing a navigation route between the current position and the destination according to user information and destination information, the user information including the type and/or a current speed of the user, the destination information including the number of people and/or an estimated visit duration at the destination, the destination including ones, at which the user has not yet arrived, of recommended sightseeing spots and/or sightseeing spots of the user' interest.

Exemplarily, the mobile terminal may record the sightseeing spots through which the user has toured so as to obtain information of not-yet-arrived sightseeing spots for the user, and adjust in real time the navigation route established for the user according to the information of not-yet-arrived sightseeing spots for the user and the user's actual route.

Assuming that an opening time duration of a sightseeing place where the user arrives is, for example, T, the user enters the sightseeing place after the sightseeing place has started opening for a period of time, for example t, and a distance to the sightseeing spots through which the user has not yet toured is, for example, 1, then a speed required for the user to finishing touring not-yet-arrived sightseeing spots may be calculated as $V=1/(T-t)$.

Step S403: establishing, if there is a scheduled sightseeing spot for the user, a navigation route to the scheduled sightseeing spot as a preferential navigation route.

Exemplarily, the user may make a reservation to sightseeing spots of his/her interest in advance, so as to reduce the waiting or queuing duration for the user. When establishing a navigation route, a navigation route to the scheduled sightseeing spot may be preferentially established.

Step S404: calculating an estimated visit duration for touring through a next sightseeing spot in the established navigation route and a scheduled starting time of the scheduled sightseeing spot.

Step S405: providing, sending or displaying a prompt message to the user to prompt the user to go to the scheduled sightseeing spot directly if a time interval from a current time to the scheduled starting time of the scheduled sightseeing spot is less than the estimated visit duration for touring through the next sightseeing spot.

For example, the user may be prompted to go to the scheduled sightseeing spot directly if the time interval from a current time to the scheduled starting time of the scheduled sightseeing spot is less than the estimated visit duration for touring through the next sightseeing spot, or else the user may be prompted to go to the scheduled sightseeing spot after the touring of the next sightseeing spot is finished, thereby reducing the waiting or queuing duration of the user at scheduled sightseeing spot.

With the technique solution of this embodiment, a prompt may be provided, sent or displayed to the user according to the scheduled starting time of the scheduled sightseeing spot of the user and the estimated visit duration for the user to tour through the next sightseeing spot, so as to select an appropriate route for the user.

In some examples, when establishing a navigation route, the navigation route may be established according to theme types corresponding to the sightseeing spots.

For example, a large-sized sightseeing place may be divided into sightseeing spots with several themes, such as a Disney theme, a forest theme and the like. When establishing the navigation route, the sightseeing spots of a same theme may be scheduled on a same one navigation path, while considering the distance, such that the user may be provided with a better experience. When the user is traveling in the place, the position of the user may be determined by the mobile terminal, and meanwhile, information about distances of the user to all sightseeing spots of a certain theme may be obtained.

In some examples, the current position of the user may be determined and a marker for the current position may be displayed on the map.

In an example, the current position of the user may be determined by using, for example, a GPS positioning way. A marker for the current position may be displayed on the map, so that the user may know his/her position in real time, avoiding lost in case of crowded people.

It will be appreciated by those skilled in the art the embodiments illustrated in FIG. 2 to FIG. 4 may be implemented separately or in combination.

Figure 5:
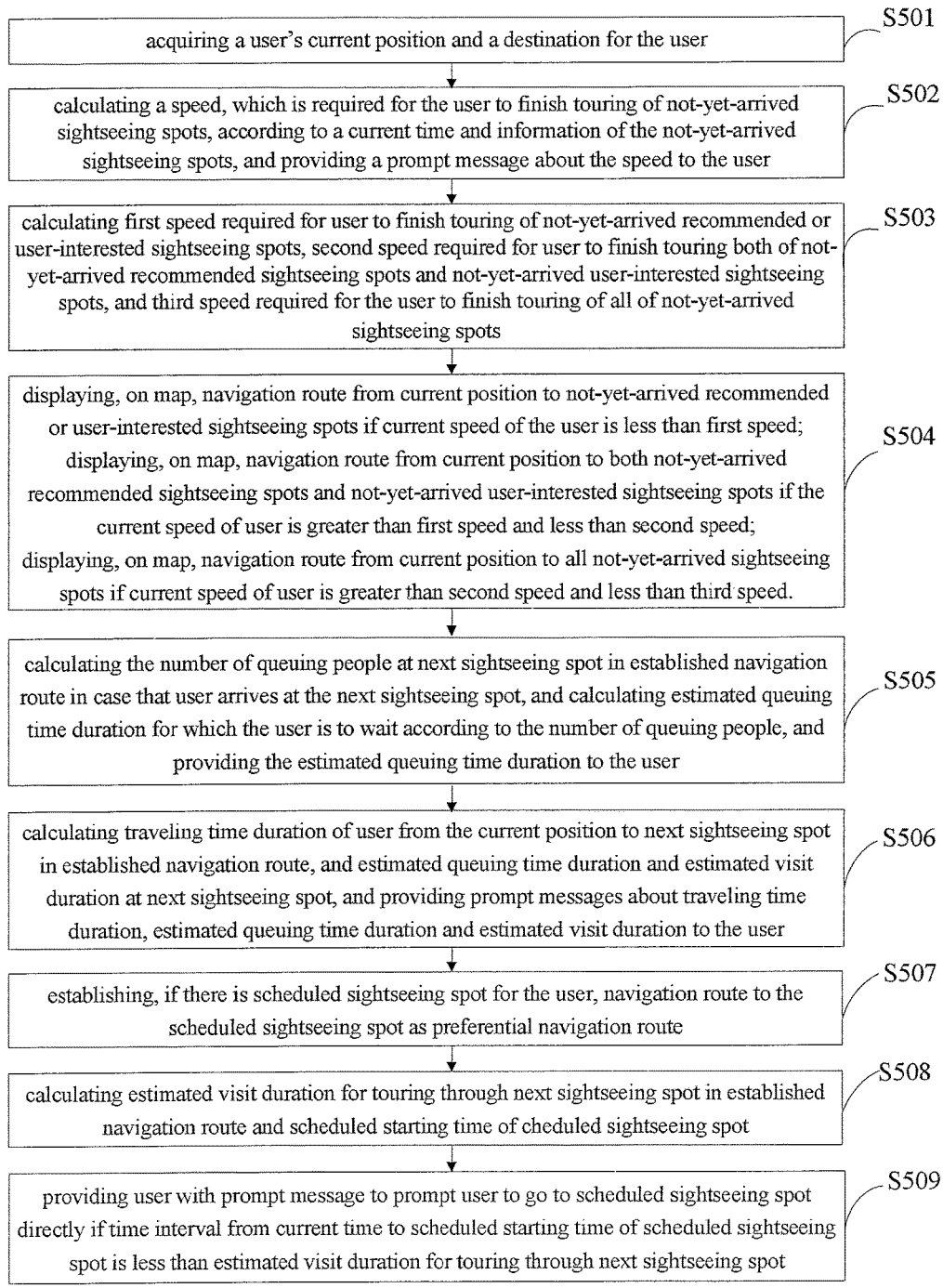
FIG. 5 is a flow chart of a method of establishing a navigation route according to a yet still further exemplary embodiment of the present disclosure

FIG. 5 is a flow chart of a method of establishing a navigation route according to a yet still further exemplary embodiment of the present disclosure. Technique schemes of the present disclosure will be further described in detail in the method of establishing a navigation route according to this embodiment on basis of the embodiments shown in FIGS. 1 to 4. As shown in FIG. 5, the method of establishing a navigation route according to this embodiment may specifically comprises following steps:

Step S501: acquiring a current position and a destination of a user.

An executive agent for this embodiment may be a mobile terminal. Specifically, the mobile terminal may be a personal mobile terminal held by the user, for example, a mobile phone, a tablet computer, a notebook computer, or the like, or may also be a special tour guide device provided by the place where the user arrives, for example, an amusement park.

The mobile terminal may determine a position of the user so as to obtain a current position of the user. The user may input or choose a destination on the mobile terminal.

Step S502: calculating a speed, which is required for the user to finish touring of not-yet-arrived sightseeing spots, according to a current time and information of the not-yet-arrived sightseeing spots, and providing, sending or displaying a prompt message about for example the speed to the user.

In an example, the mobile terminal may record the sightseeing spots through which the user has toured so as to obtain information of not-yet-arrived sightseeing spots for the user, and adjust in real time the navigation route established for the user according to the information of not-yet-arrived sightseeing spots for the user and the user's actual route.

Assuming that an opening time duration of a sightseeing place where the user arrives is, for example, T, the user enters the sightseeing place after the sightseeing place has started opening for a period of time, for example t, and a distance to the sightseeing spots through which the user has not yet toured is, for example, 1, then a speed required for the user to finishing touring not-yet-arrived sightseeing spots may be calculated as V=1/(T−t).

Step S503: calculating a first speed which is required for the user to finish touring of not-yet-arrived recommended sightseeing spots or not-yet-arrived user-interested sightseeing spots, a second speed which is required for the user to finish touring of not-yet-arrived recommended sightseeing spots and not-yet-arrived user-interested sightseeing spots, and a third speed which is required for the user to finish touring of all of not-yet-arrived sightseeing spots.

For example, the first speed which is required for the user to finish touring of not-yet-arrived recommended sightseeing spots or not-yet-arrived user-interested sightseeing spots is $v_1$, the second speed which is required for the user to finish touring of not-yet-arrived recommended sightseeing spots and not-yet-arrived user-interested sightseeing spots is $v_2$, and the third speed which is required for the user to finish touring of all of not-yet-arrived sightseeing spots is $v_3$, where $v_1 \leq v_2 \leq v_3$.

Step S504: displaying, on a map, a navigation route from the current position to the not-yet-arrived recommended sightseeing spots or the not-yet-arrived user-interested sightseeing spots if the current speed of the user is less than the first speed;

displaying, on the map, a navigation route from the current position to the not-yet-arrived recommended sightseeing spots and the not-yet-arrived user-interested sightseeing spots if the current speed of the user is greater than the first speed and less than the second speed; and displaying, on the map, a navigation route from the current position to all of the not-yet-arrived sightseeing spots if the current speed of the user is greater than the second speed and less than the third speed.

As can be seen if the current speed of the user is v and if $v \leq v_1$, the current speed of the user is slower and it is not possible for the user to tour through all sightseeing spots, thus a navigation route from the current position to the not-yet-arrived recommended sightseeing spots or the not-yet-arrived user-interested sightseeing spots may be established for the user; if $v_1 \leq v \leq v_2$, the speed of the user is faster but it is still not possible for the user to tour through all sightseeing spots, thus a navigation route from the current position to the not-yet-arrived recommended sightseeing spots and the not-yet-arrived user-interested sightseeing spots may be established for the user; if $v_2 \leq v \leq v_3$, the speed of the user is faster and it is possible for the user to tour through all sightseeing spots, thus a navigation route from the current position to all of the not-yet-arrived sightseeing spots may be established for the user. It will be appreciated by those skilled in the art that if $v > v_3$, it is possible for the user to tour through all sightseeing spots, and in this case, a navigation route from the current position to all of the not-yet-arrived sightseeing spots may be still established for the user.

Step S505: calculating the number of queuing people at a next sightseeing spot in the established navigation route in case that the user arrives at the next sightseeing spot, and calculating an estimated queuing time duration for which the user is to wait or queue according to the number of queuing people, and providing the estimated queuing time duration to the user.

For example, an estimated visit duration required for one sightseeing spot is $T_1$, and when the user comes at a queuing region of the sightseeing spot, a receiver apparatus provided in the queuing region will receive a signal from the mobile terminal. If the mobile terminal is a mobile phone, the receiver apparatus may be a base station; the signals received by the receiver apparatus are counted, such that the current number of queuing people may be determined for example as N.

In some examples, the number of people around a sightseeing spot in which the user is to come may be estimated. Exemplarily, a sightseeing spot to which another user is closest may be processed as a desired sightseeing spot for the another user, and a sightseeing spot to which the another user is secondarily closer may be processed as a desired sightseeing spot for the another user if the another user has toured through the closest sightseeing spot, thereby estimating the numbers of people at respective sightseeing spots.

For example, when counting the number of people around a certain user A, assuming that a distance from the user A to one sightseeing spot is $S_A$, a current speed of the user A is $V_A$, a distance from a user B around the user A to the sightseeing spot is $S_B$, and a current speed of the user B around the user A is $V_B$, then:

if $S_A/V_A \leq S_B/V_B$, that is, a length of time for the another user B to reach the sightseeing spot is greater than a length of time for the user A to reach the sightseeing spot, thus the user A will reach the sightseeing spot at earlier time than the another user B, and the user B may not be counted into the number of queuing people; and if $S_A/V_A > S_B/V_B$, that is, a length of time for the another user B to reach the sightseeing spot is less than a length of time for the user A to reach the sightseeing spot, thus the user B will reach the sightseeing spot at earlier time than the user A, and the user B will be counted into the number of queuing people.

If lengths of time for a number of users, for example, M another users, to reach the sightseeing spot are less than the length of time for the user A to reach the sightseeing spot, there may be (most) M+N persons who are queuing when the user A arrives at the sightseeing spot. Assuming a preset time length for buying a ticket by each person is t0, then a possible or estimated waiting or queuing duration for the user A may be calculated as $t0*(M+N-S_A N_A/t0)$, where "$S_A/V_A/t0$" represents the number of people who have bought tickets at the sightseeing spot within a period of time for which the user A spends to travel and reach the sightseeing spot. If a distance of the user A to the sightseeing spot is very small, it may be determined that there is no change or a little negligible change in N when the user A arrives at the sightseeing spot, that is, "$S_A/V_A/t0$" may be negligible, then a possible or estimated (maximum) waiting or queuing duration for the user A may be calculated as $t0*(M+N)$.

Step S506: calculating a traveling time duration of the user from the current position to the next sightseeing spot in the established navigation route, and an estimated queuing time duration and an estimated visit duration at the next sightseeing spot, and providing, sending or displaying prompt messages about these time durations to the user.

For example, assuming an estimated visit duration of the user at one sightseeing spot is $t_2$, and an estimated queuing time duration of the user at the sightseeing spot is $t_3$, then a total time duration for the user to tour through the sightseeing spot may be calculated as $t_2+t_3$. The navigation route may be established for the user according to estimated visit durations of all sightseeing spots and a traveling time duration of the user from the current position to the next sightseeing spot in the established navigation route. Meanwhile, since the numbers of people at respective sightseeing spots often vary, the estimated visit duration and the numbers of people may be calculated at a preset time interval, such that the navigation route may be adjusted in real time.

In some examples, a traveling time duration of the user from the current position to the next sightseeing spot in the established navigation route, and an estimated queuing time duration and an estimated visit duration at the next sightseeing spot may be calculated, and prompt messages about these time durations may be provided, sent or displayed to the user, so that the user may adjust the route according to his/her preference. Here, the estimated visit duration may include a duration for touring through the sightseeing spot and a duration for watching a performance program.

Step S507: establishing, if there is a scheduled sightseeing spot for the user, a navigation route to the scheduled sightseeing spot as a preferential navigation route.

Exemplarily, the user may make a reservation to sightseeing spots of his/her interest in advance, so as to reduce the waiting or queuing duration for the user. When establishing a navigation route, a navigation route to the scheduled sightseeing spot may be preferentially established.

Step S508: calculating an estimated visit duration for touring through a next sightseeing spot in the established navigation route and a scheduled starting time of the scheduled sightseeing spot.

Step S509: providing, sending or displaying a prompt message to the user to prompt the user to go to the scheduled sightseeing spot directly if a time interval from a current time to the scheduled starting time of the scheduled sightseeing spot is less than the estimated visit duration for touring through the next sightseeing spot.

For example, the user may be prompted to go to the scheduled sightseeing spot directly if the time interval from a current time to the scheduled starting time of the scheduled sightseeing spot is less than the estimated visit duration for touring through the next sightseeing spot, or else the user may be prompted to go to the scheduled sightseeing spot after the touring of the next sightseeing spot is finished, thereby reducing the waiting or queuing duration of the user at the scheduled sightseeing spot.

In some examples, when establishing a navigation route, the navigation route may be established according to theme types corresponding to the sightseeing spots.

For example, a large-sized sightseeing place may be divided sightseeing spots with several themes, such as a Disney theme, a forest theme and the like. When establishing the navigation route, the sightseeing spots of a same theme may be scheduled on a same one navigation path, while considering the distance, such that the user may be provided with a better experience. When the user is traveling in the place, the position of the user may be determined by the mobile terminal, and meanwhile, information about distances of the user to all sightseeing spots of a certain theme may be obtained.

In some examples, the current position of the user may be determined and a marker for the current position may be displayed on the map.

In an example, the current position of the user may be determined by using, for example, a GPS positioning way. A marker for the current position may be displayed on the map, so that the user may know his/her position in real time, avoiding lost in case of crowed people.

With the technique solution of this embodiment, the current position and the destination of the user are acquired, and a navigation route is established between the current position and the destination according to user information and destination information. In some examples, when establishing the navigation route, the physical performance and possible preference of the user may be determined by making a reference to the type and current speed of the user, and a time duration required for the user to touring through the destination may also be determined by making a reference to the number of people and/or the estimated visit duration at the destination. As such, an appropriate navigation route may be established for the user; meanwhile, an estimated queuing or waiting time duration for the user may be calculated by making a reference to the number of people at the sightseeing spot or destination, and a navigation route may be appropriately established for the user according to reservation from the user.

An exemplary embodiment of the present disclosure further provides a device of establishing a navigation route, the device of establishing a navigation route according to this embodiment may specifically comprises an acquisition module 61 and a route establishing module 62.

The acquisition module 61 is configured to acquire a current position and a destination of a user; and The route establishing module 62 is configured to establish a navigation route between the current position and the destination according to user information and destination information, the user information including the type and/or a current speed of the user, the destination information including the number of people and/or an estimated visit duration at the destination, the destination including ones, at which the user has not yet arrived, of recommended sightseeing spots and/or sightseeing spots of the user' interest.

Implementation mechanism of the device of establishing a navigation route according to this embodiment for establishing a navigation route by using the above modules is the same as that of the method of establishing a navigation route in the embodiments shown in FIGS. 1-5, and it detail may refer to the above description of the embodiments shown in FIGS. 1-5 and will not be repeatedly described here.

According to an embodiment of the present disclosure, the device of establishing a navigation route may comprise the above mobile terminal, and the acquisition module and/or the route establishing module may, separately or together, execute steps/actions or the like in the method described in the above embodiments. Exemplarily, the current position of the user may be provided or acquired by a positioning or navigation module or application in the mobile terminal, and the user may input or select a destination on the mobile terminal.

In some examples, the route establishing module is further configured to calculate a speed, which is required for the user to finish touring of not-yet-arrived sightseeing spots, according to a current time and information of the not-yet-arrived sightseeing spots, and providing a prompt message about the speed to the user.

In some examples, the route establishing module is further configured to: calculate a first speed which is required for the user to finish touring of not-yet-arrived recommended sightseeing spots or not-yet-arrived user-interested sightseeing spots, a second speed which is required for the user to finish touring of not-yet-arrived recommended sightseeing spots and not-yet-arrived user-interested sightseeing spots, and a third speed which is required for the user to finish touring of all of not-yet-arrived sightseeing spots; display, on a map, a navigation route from the current position to the not-yet-arrived recommended sightseeing spots or the not-yet-arrived user-interested sightseeing spots if the current speed of the user is less than the first speed; display, on the map, a navigation route from the current position to the not-yet-arrived recommended sightseeing spots and the not-yet-arrived user-interested sightseeing spots if the current speed of the user is greater than the first speed and less than the second speed; and display, on the map, a navigation route from the current position to all of the not-yet-arrived sightseeing spots if the current speed of the user is greater than the second speed and less than the third speed.

In some examples, the route establishing module is further configured to: calculate the number of queuing people at a next sightseeing spot in the established navigation route in case that the user arrives at the next sightseeing spot, and calculate an estimated queuing time duration for which the user is to wait according to the number of queuing people, and provide the estimated queuing time duration to the user.

In some examples, the route establishing module is further configured to: calculate a traveling time duration of the user from the current position to the next sightseeing spot in the established navigation route, and an estimated queuing time duration and an estimated visit duration at the next sightseeing spot, and provide prompt message about the traveling time duration, the estimated queuing time duration and the estimated visit duration to the user.

In some examples, the route establishing module is further configured to establish, if there is a scheduled sightseeing spot for the user, a navigation route to the scheduled sightseeing spot as a preferential navigation route.

In some examples, the route establishing module is further configured to: calculate an estimated visit duration for touring through a next sightseeing spot in the established navigation route and a scheduled starting time of the scheduled sightseeing spot; and provide the user with a prompt message to prompt the user to go to the scheduled sightseeing spot directly if a time interval from a current time to the scheduled starting time of the scheduled sightseeing spot is less than the estimated visit duration for touring through the next sightseeing spot.

In some examples, the route establishing module is further configured to establish a navigation route according to theme types corresponding to the sightseeing spots.

In some examples, the route establishing module is further configured to determine the current position of the user and displaying a marker for the current position on a map.

In some examples, the route establishing module is further configured to: record the sightseeing spots through which the user has toured so as to obtain information of not-yet-arrived sightseeing spots for the user; and adjust in real time the navigation route established for the user according to the information of the not-yet-arrived sightseeing spots for the user and the user's actual route.

Exemplarily, the acquisition module and/or route establishing module may be implemented in form of hardware, software and/or firmware in the device of establishing a navigation route, for example, may be, separately or together, implemented by one or more logic operation processing circuits. The logic operation processing circuit may be implemented as a processor, for example, may be a Central Processing Unit (CPU), an Application Specific Integrated Circuit (ASIC), a Digital Signal Processor (DSP), a Field Programmable Gate Array (FPGA), a Single-chip Microcomputer (MCU) or the like.

In this text, unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In the above description, exemplary embodiments have been described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware.

It will be understood by those skilled in the art that the present disclosure includes devices for implementing one or more of methods, steps, operations or functions of modules in the present application. These devices may be specially designed and manufactured for desired purposes, or may include known devices in general-purpose computers. These devices have computer programs stored therein which are selectively activable or reconstructable. Such computer programs may be stored in a device (for example, computer) readable medium or in any kind of medium adapted to store electronic instructions therein and to be coupled with a bus, the computer readable medium includes but is not limited any type of disk (including floppy disk, hard disk, compact disc, CD-ROM and magneto-optical disk), ROM (Read-Only Memory), RAM (Random Access Memory), EPROM (Erasable Programmable Read-Only Memory), EEPROM (Electrically Erasable Programmable Read-Only Memory), flash, magnetic card or optical card. That is, the readable medium include any medium for storing or transmitting information therein in readable form devices (for example, computer).

With technique solutions of the embodiments of the present disclosure, the current position and the destination of the user are acquired, and a navigation route is established between the current position and the destination according to user information and destination information; when establishing the navigation route, the physical performance and possible preference of the user may be determined by making a reference to the type and current speed of the user, and a time duration required for the user to touring through the destination may also be determined by making a reference to the number of people and/or the estimated visit duration at the destination, such that an appropriate navigation route may be established for the user, saving time for the user.

It will be appreciated that the above embodiments are only exemplary embodiments for illuminating inventive concepts of the present disclosure, and are not intended to limit the present disclosure, the scope of which is defined in the claims and their equivalents. Various changes or modifications may be made by those skilled in the art without departing from the principle and spirit of the present disclosure and shall fall within the scope of the present disclosure.

What is claimed is:

1. A method of establishing a navigation route, comprising:
   acquiring a user's current position and a destination for the user; and
   establishing a navigation route between the current position and the destination according to user information and destination information,
   wherein, the user information includes the type and/or a current speed of the user, the destination information includes the number of people and/or an estimated visit duration at the destination, and the destination includes ones, at which the user has not yet arrived, of recommended sightseeing spots and/or user-interested sightseeing spots.

2. The method according to claim 1, wherein the establishing a navigation route between the current position and the destination according to user information and destination information comprises:
   calculating a speed, which is required for the user to finish touring of not-yet-arrived sightseeing spots, according to a current time and information of the not-yet-arrived sightseeing spots, and providing a prompt message about the speed to the user.

3. The method according to claim 2, wherein the method further comprises:
   calculating a first speed which is required for the user to finish touring of not-yet-arrived recommended sightseeing spots or not-yet-arrived user-interested sightseeing spots, a second speed which is required for the user to finish touring both of not-yet-arrived recommended sightseeing spots and not-yet-arrived user-interested sightseeing spots, and a third speed which is required for the user to finish touring of all of not-yet-arrived sightseeing spots;
   displaying, on a map, a navigation route from the current position to the not-yet-arrived recommended sightseeing spots or to the not-yet-arrived user-interested sightseeing spots if the current speed of the user is less than the first speed;
   displaying, on the map, a navigation route from the current position to both the not-yet-arrived recommended sightseeing spots and the not-yet-arrived user-interested sightseeing spots if the current speed of the user is greater than the first speed and less than the second speed; and
   displaying, on the map, a navigation route from the current position to all of the not-yet-arrived sightseeing spots if the current speed of the user is greater than the second speed and less than the third speed.

4. The method according to claim 1, wherein the method further comprises:
   calculating the number of queuing people at a next sightseeing spot in the established navigation route in case that the user arrives at the next sightseeing spot, and
   calculating an estimated queuing time duration for which the user is to wait according to the number of queuing people, and providing the estimated queuing time duration to the user.

5. The method according to claim 4, wherein the method further comprises:
   calculating a traveling time duration of the user from the current position to the next sightseeing spot in the established navigation route, and an estimated queuing time duration and an estimated visit duration at the next sightseeing spot, and providing prompt messages about the traveling time duration, the estimated queuing time duration and the estimated visit duration to the user.

6. The method according to claim 1, wherein the method further comprises:
   establishing, if there is a scheduled sightseeing spot for the user, a navigation route to the scheduled sightseeing spot as a preferential navigation route.

7. The method according to claim 6, wherein the method further comprises:

calculating an estimated visit duration for touring through a next sightseeing spot in the established navigation route and a scheduled starting time of the scheduled sightseeing spot; and providing the user with a prompt message to prompt the user to go to the scheduled sightseeing spot directly if a time interval from a current time to the scheduled starting time of the scheduled sightseeing spot is less than the estimated visit duration for touring through the next sightseeing spot.

8. The method according to claim 1, wherein the method further comprises:
establishing a navigation route according to theme types corresponding to the sightseeing spots.

9. The method according to claim 1, wherein the method further comprises:
determining the current position of the user and displaying a marker for the current position on a map.

10. The method according to claim 1, wherein the method further comprises:
recording the sightseeing spots through which the user has toured so as to obtain information of not-yet-arrived sightseeing spots for the user; and
adjusting in real time the navigation route established for the user according to the information of the not-yet-arrived sightseeing spots for the user and the user's actual route.

11. A device of establishing a navigation route, comprises:
an acquisition module configured to acquire a user's current position and a destination for the user; and
a route establishing module configured to establish a navigation route between the current position and the destination according to user information and destination information, the user information including the type and/or a current speed of the user, the destination information including the number of people and/or an estimated visit duration at the destination, the destination including ones, at which the user has not yet arrived, of recommended sightseeing spots and/or user-interested sightseeing spots.

12. The device according to claim 11, wherein the route establishing module is further configured to:
calculate a speed, which is required for the user to finish touring of not-yet-arrived sightseeing spots, according to a current time and information of the not-yet-arrived sightseeing spots, and provide a prompt message about the speed to the user.

13. The device according to claim 12, wherein the route establishing module is further configured to:
calculate a first speed which is required for the user to finish touring of not-yet-arrived recommended sightseeing spots or not-yet-arrived user-interested sightseeing spots, a second speed which is required for the user to finish touring both of not-yet-arrived recommended sightseeing spots and not-yet-arrived user-interested sightseeing spots, and a third speed which is required for the user to finish touring of all of not-yet-arrived sightseeing spots;
display, on a map, a navigation route from the current position to the not-yet-arrived recommended sightseeing spots or to the not-yet-arrived user-interested sightseeing spots if the current speed of the user is less than the first speed;
display, on the map, a navigation route from the current position to both the not-yet-arrived recommended sightseeing spots and the not-yet-arrived user-interested sightseeing spots if the current speed of the user is greater than the first speed and less than the second speed; and
display, on the map, a navigation route from the current position to all of the not-yet-arrived sightseeing spots if the current speed of the user is greater than the second speed and less than the third speed.

14. The device according to claim 11, wherein the route establishing module is further configured to:
calculate the number of queuing people at a next sightseeing spot in the established navigation route in case that the user arrives at the next sightseeing spot, and
calculate an estimated queuing time duration for which the user is to wait according to the number of queuing people, and provide the estimated queuing time duration to the user.

15. The device according to claim 14, wherein the route establishing module is further configured to:
calculate a traveling time duration of the user from the current position to the next sightseeing spot in the established navigation route, and an estimated queuing time duration and an estimated visit duration at the next sightseeing spot, and
provide prompt messages about the traveling time duration, the estimated queuing time duration and the estimated visit duration to the user.

16. The device according to claim 11, wherein the route establishing module is further configured to:
establish, if there is a scheduled sightseeing spot for the user, a navigation route to the scheduled sightseeing spot as a preferential navigation route.

17. The device according to claim 16, wherein the route establishing module is further configured to:
calculate an estimated visit duration for touring through a next sightseeing spot in the established navigation route and a scheduled starting time of the scheduled sightseeing spot; and
provide the user with a prompt message to prompt the user to go to the scheduled sightseeing spot directly if a time interval from a current time to the scheduled starting time of the scheduled sightseeing spot is less than the estimated visit duration for touring through the next sightseeing spot.

18. The device according to claim 11, wherein the route establishing module is further configured to:
establish a navigation route according to theme types corresponding to the sightseeing spots.

19. The device according to claim 11, wherein the route establishing module is further configured to:
determine the current position of the user and displaying a marker for the current position on a map.

20. The device according to claim 11, wherein the route establishing module is further configured to:
record the sightseeing spots through which the user has toured so as to obtain information of not-yet-arrived sightseeing spots for the user; and
adjust in real time the navigation route established for the user according to the information of the not-yet-arrived sightseeing spots for the user and the user's actual route.

* * * * *